United States Patent [19]
Jungbluth et al.

[11] 3,898,010
[45] Aug. 5, 1975

[54] APPARATUS AND METHOD FOR DISASSEMBLY OF A TAPERED, KEYLESS CONNECTION BY MEANS OF FLUID PRESSURE

[75] Inventors: Leroy F. Jungbluth, Racine, Wis.; James B. Black, Roscoe, Ill.

[73] Assignee: Twin Disc, Incorporated, Racine, Wis.

[22] Filed: Nov. 1, 1974

[21] Appl. No.: 519,878

[52] U.S. Cl. .................................... 403/15; 403/34
[51] Int. Cl.[2] ........................................... F16B 1/06
[58] Field of Search ............ 403/15, 34, 35, 36, 37, 403/38, 39, 40, 16, 31; 279/1 E; 85/1 C, DIG. 2; 29/252, 427

[56] References Cited
UNITED STATES PATENTS

| 2,482,662 | 9/1949 | Dunne | 403/16 |
|---|---|---|---|
| 2,804,439 | 6/1937 | Hamer | 403/15 |
| 3,002,770 | 10/1961 | Chesnut et al. | 285/355 |
| 3,033,597 | 5/1962 | Miller | 403/15 |
| 3,061,342 | 10/1962 | Feller | 403/15 |

*Primary Examiner*—Andrew V. Kundrat
*Attorney, Agent, or Firm*—James E. Nilles

[57] ABSTRACT

Apparatus and a method for utilizing hydraulic pressure to separate a tapered, keyless connection between two members, for example between a shaft and a gear press-fit thereon. The invention includes the use of a threaded bolt means for building up the hydraulic pressure and furthermore contemplates the use of Teflon tape around the bolt means so as to seal the bolt means at its threaded aperture to enable the application of sufficient hydraulic force to cause the parts to be separated. Fluid such as grease or oil is placed in passageways in the parts and when the pressure is applied by tightening the threaded member, the parts are forcibly separated and to prevent them from flying apart in a hazardous manner, other bolt means which connect the parts are backed-off partially so as to stop the separating movement between the parts after the tapered joint has been broken.

6 Claims, 4 Drawing Figures

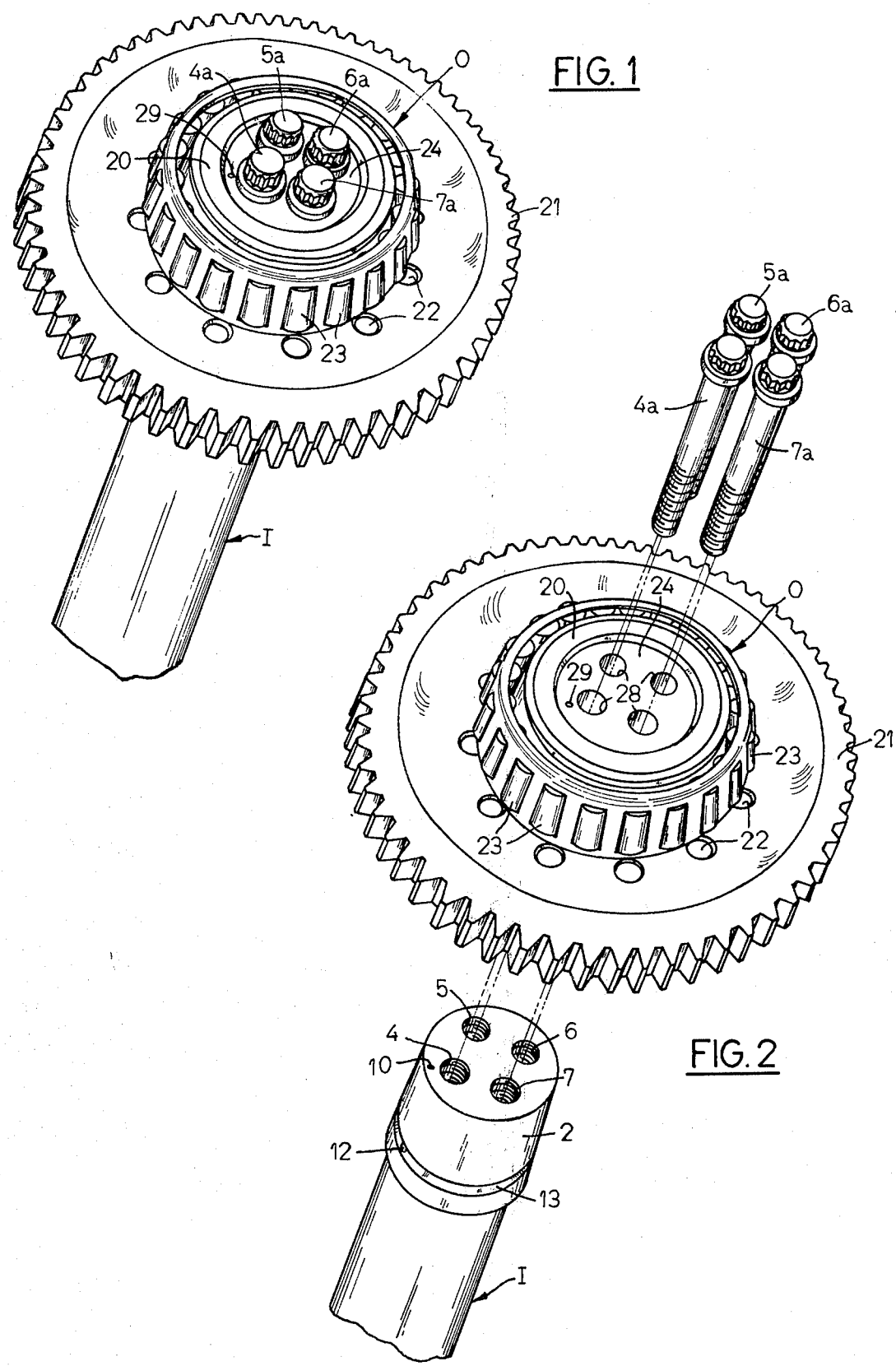

APPARATUS AND METHOD FOR DISASSEMBLY OF A TAPERED, KEYLESS CONNECTION BY MEANS OF FLUID PRESSURE

BACKGROUND OF THE INVENTION

Many prior art devices have been proposed and used for the separation of a tapered joint by means of hydraulic pressure applied between the joint. These prior art devices have not been entirely satisfactory for several reasons. One of the shortcomings is that complicated pressure applying devices and associated plumbing were necessary to build up the pressure between the parts to be separated. Furthermore, these devices required the use of extremely high pressure, the apparatus of which was not only difficult to set up and expensive but also involved considerable labor and other attendent apparatus. Still other devices proposed to use more simple means for applying the pressure, but these did not prove satisfactory, because of their inability to develop sufficient pressure, particularly without leakage in the force applying parts. Still other prior art devices were unsatisfactory because of the inherent danger in the means and method for applying the pressure and causing separation of the parts.

Examples of some prior art devices are shown in the U.S. Pat. No. 2,084,439 issued June 22, 1937 to Hamer and wherein certain fixtures were required to apply the necessary fluid force and furthermore, extremely close tolerances were required in the area of the piston and bore. Other examples are U.S. Pat. Nos. 2,764,437 issued Sept. 25, 1956 to Bratt; 3,033,597 issued May 8, 1962 to Miller; 3,690,707 issued Sept. 12, 1972 to Cornelius van Rooij; and 3,698,750 issued Oct. 17, 1972 to Eastcott et al.

SUMMARY OF THE PRESENT INVENTION

The present invention provides a means for separating a tapered, keyless connection between an inner member, such as a shaft, and an outer member, such as a gear assembly mounted on said shaft, and which shaft and gear assembly are press-fit together with considerable force for operating as a single rotational unit. The invention provides bolt means which are threadably engaged in the axial end of the members and one of the bolt means includes a threaded aperture in the inner member such as the shaft and which shaft also has a fluid passage between the threaded aperture and the joint between the inner and outer members; an annular groove can also be provided either in the inner member or in the internal periphery of the outer member so as to cause the pressure fluid to be distributed around the tapered joint. The invention further contemplates filling the said threaded apertures and passages with a fluid, then wrapping the bolt for that aperture with Teflon tape and inserting the wrapped bolt in its threaded aperture where it is tightened with sufficient torque to build up fluid pressure in the passage between the tapered joint between the parts. The other bolts are backed off an appropriate amount so as to prevent the explosive, hazardous and complete parting of the members when the pressure applying bolt means finally builds up sufficient pressure to cause the members to part with considerable force.

These and other objects and advantages of the present invention will appear hereinafter as this disclosure progresses, reference being had to the accompanying drawings.

BRIEF DESCRIPTION OF THE DRAWINGS

FIG. 1 is a perspective view of the two members embodying the present invention and in assembled relationship;

FIG. 2 is a view similar to FIG. 1, but showing the parts in exploded view for showing the parts for the sake of clarity in the drawings;

DESCRIPTION OF A PREFERRED EMBODIMENT

Figure 3:
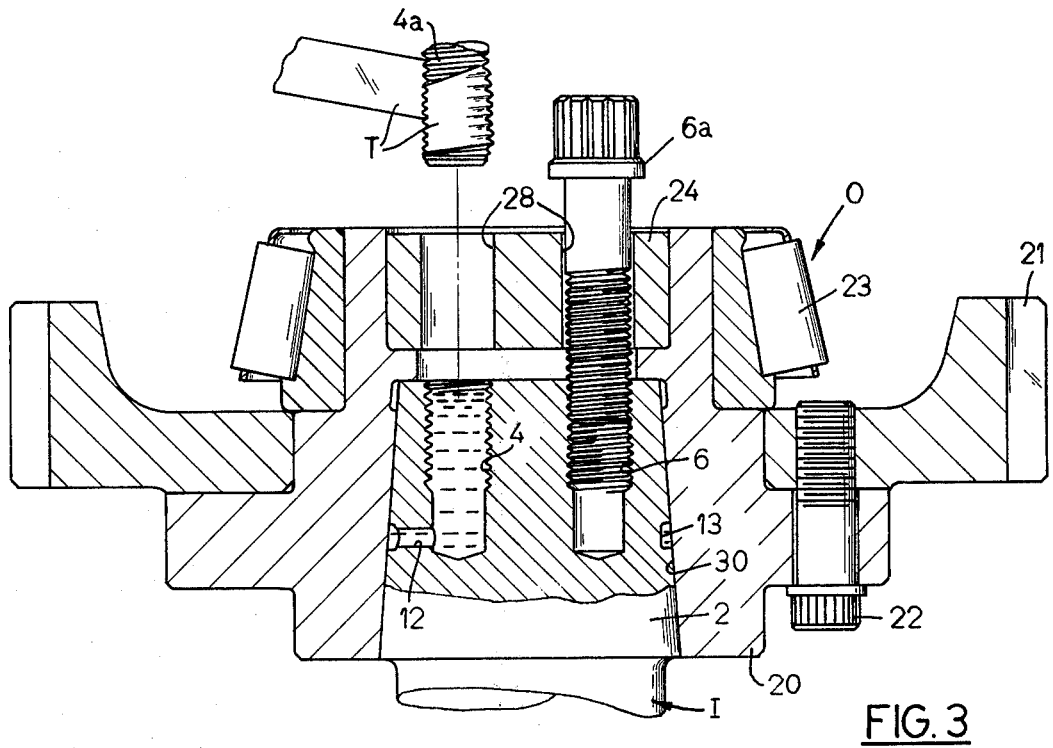
FIG. 3 is a transverse, cross sectional view through the device shown in FIG. 1, but on an enlarged scale and furthermore showing the pressure applying bolt means removed from the aperture, and the other bolt means being backed off prior to disassembly.

The invention can be utilized to separate inner and outer members of different configurations and having a tapered connection therebetween and the invention eliminates the necessity for conventional keys and keyways, splines, or other means for preventing relative rotation between the inner and outer members during operation. As shown in the drawings, and for purposes of illustrating the invention, the inner member I is shown as being a shaft having an enlarged tapered end 2. Disposed axially in the end of the enlarged member are four threaded holes, 4, 5, 6 and 7. It will be noted in FIG. 2 that one of the holes has a marking 10 adjacent it and this hole, as shown in FIG. 3, also has a passage 12 connecting the innermost portion of the threaded hole 4 with an annular groove 13 formed around the periphery of the tapered portion 2.

The outer member O is comprised of a hub 20 having a gear member 21 fixed thereon by cap screws 22 and an anti-friction bearing assembly 23 press-fit on the outer, reduced end of the hub 20. A keeper disc 24 is press-fit into the axial end of the hub 20 and is thus permanently conneted to the hub. A series of holes 28 extend through the keeper 24 and in alignment with the threaded holes 4 in the shaft, whereby threaded members in the form of cap screws 4a, 5a, 6a and 7a may extend through the corresponding holes in the keeper plate and be threadably engaged in the respective threaded holes 4, 5, 6 and 7, extending axially in the end of the shaft I. One of the holes 28 has a mark 29 adjacent to it which identifies it as being aligned with threaded hole 4 having the identifying mark 10.

The cap screws have their outer, enlarged head ends shaped for the reception of a complementary, removable hand wrench (not shown). The hub member 20 has a tapered surface 30 which complements the tapered surface 2 on the shaft and as shown in FIG. 3, the outer member O has been tightly press-fit onto the tapered portion 2 of the shaft.

Assume that it is desired to separate the inner and outer parts, that is to separate parts at their tapered, keyless connection. In that situation, three of the cap screws 5, 6 and 7 would be backed out of their threaded holes in the shaft a sufficient amount as shown in FIG. 3, so that the remaining threaded engagement is of sufficient strength to hold the parts in partially assembled relationship while the disconnection is made, as will appear. The fourth cap screw 4a (identified by marking 10) is removed, and threaded hole 4 in the shaft, the passage 12 and the annular groove 13 are filled with fluid such as oil or grease. A portion of screw 4a is then wrapped with Teflon tape T in accordance with the present invention and the cap screw 4a is then reinserted into threaded engagement with its threaded hole 4. It is now possible for the mechanic to simply apply a wrench to the enlarged, wrench receiving end of the cap screw 4a and tighten the latter into its threaded hole 4.

Figure 4:
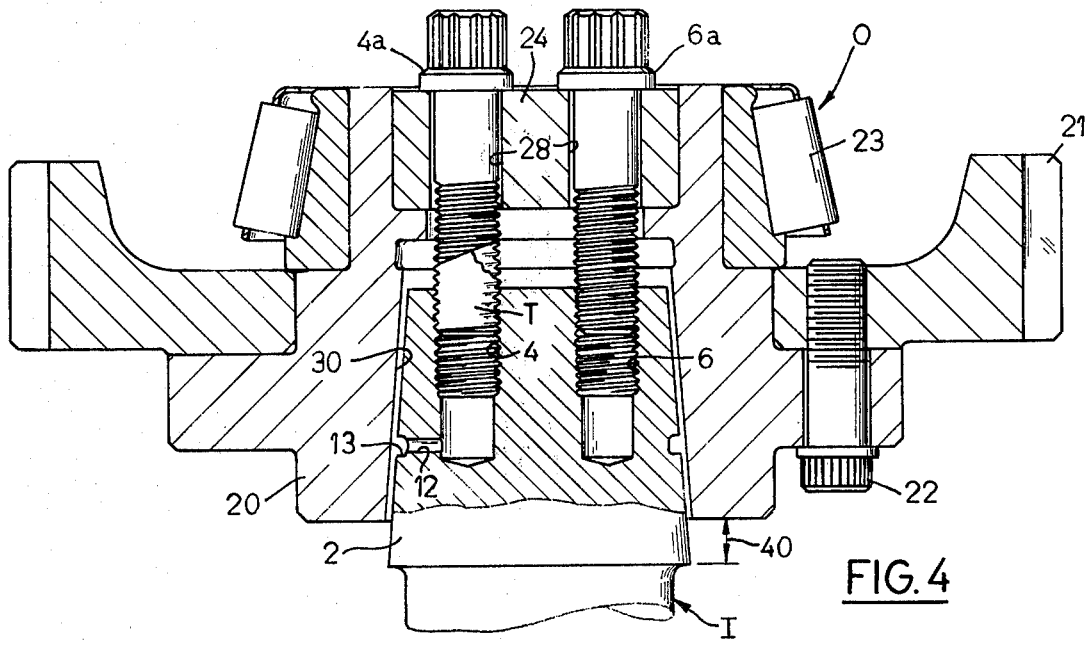
FIG. 4 is a view similar to FIG. 3, but showing the entire assembly after the inner and outer members have been parted by hydraulic pressure applied therebetween.

It has been found that an application of torque in the neighborhood of 60 foot-pounds is sufficient to build up adequate fluid pressure in the tapered joint to cause forceful and immediate separation of the parts in an axial direction. In some prior art devices, on the other hand, such as those using separate pressure applying tools and high strength plumbing, the necessary pressure to cause the separation has been in excess of 20,000 p.s.i. In any event, as shown in FIG. 4, it will be noticed that the parts have been separated axially an amount indicated by the numeral 40. This amount of course varies depending on the size and shape of the taper, but experience has shown that with a taper of three-eights inch per side per foot of length, a distance 40 of three-sixteenths inches is satisfactory. Consequently, as shown in FIG. 3, the other threaded members in the form of cap screws 5a, 6a and 7a, prior to disengagement, have been backed off three-sixteenths inches in the example shown.

By means of the present invention, a manually tightened cap screw, having Teflon to adequately seal its threads, can be used to build up sufficient hydraulic pressure in the tapered joint to cause forceful and immediate separation of the parts. The other cap screws and the keeper portion 24 insures a safe operation by causing the keeper portion to abut against the enlarged, wrench receiving outer ends of the other threaded members which have been backed off in their threaded holes.

As indicated above, the fluid used with the present invention can be of different types, for example, such as oil or grease. Grease is particularly useful when the fluid passages to be filled are upside down, that is when they are open in a downward direction and it would be impossible to pour oil in them, thereby grease is used. Consequently, the term fluid is used with the present application as contemplated as covering other materials falling within the scope of the present invention. The use of Teflon tape as above described has been found to be particularly desirable in effectively sealing the joint but it also permits the threaded joint to be readily assembled and furthermore it permits the use of standard V-threads with the present invention.

We claim:

1. An assembly having inner and outer members connected together by a tapered and keyless connection and comprising, an inner member having an axially tapered portion, said inner member having a plurality of axially aligned threaded holes which are alignable with corresponding holes in a keeper portion of said outer member, one of said threaded holes having a fluid passage connection with said tapered connection between said members, fluid in said one threaded hole and said fluid passage connection, threaded members extending through said holes in said keeper portion and threadably engaged in said threaded holes, Teflon tape around a threaded portion of said one of said threaded members for engagement in said one threaded hole whereby forcible threaded engagement of said threaded member into said threaded hole permits fluid pressure built-up in said threaded hole and in between said tapered connection for separation of said members.

2. The assembly set forth in claim 1 further characterized in that said fluid passage connection includes an annular groove in the periphery of said axially tapered portion of said inner member, and a fluid passage connects said one threaded hole with said groove.

3. An assembly having inner and outer members connected together by a tapered and keyless connection and comprising, an inner member having an axially tapered portion, an outer member having a complementary shaped tapered opening and axially slideable on said inner member tapered portion to form a tight press-fit therewith, said outer member having a keeper portion through which a plurality of holes extend in an axial direction, said inner member having a plurality of axially aligned threaded holes which are alignable with said holes in said keeper portion, one of said threaded holes having a fluid passage connection with said tapered connection between said members, fluid in said one threaded hole and said fluid passage connection, threaded members extending through said holes in said keeper portion and threadably engaged in said threaded holes, Teflon tape around a threaded portion of one of said threaded members for engagement in said one threaded hole whereby threaded engagement of said threaded member into said threaded hole permits fluid pressure build-up in said threaded hole and in betweeen said tapered connection for separation of said members when said other threaded members are backed off partially in their corresponding threaded holes.

4. The assembly set forth in claim 3 further characterized in that said fluid passage connection includes an annular groove in the periphery of said axially tapered portion of said inner member, and a fluid passage connects said one threaded hole with said groove.

5. An assembly having inner and outer members connected together by a tapered and keyless connection and comprising, an inner member having an axially tapered portion, an outer member having a complementary shaped tapered opening and axially slideable on said inner member tapered portion to form a tight press-fit therewith, said outer member having a keeper portion through which a plurality of holes extend in an axial direction, said inner member having a plurality of axially aligned threaded holes which are alignable with said holes in said keeper portion, one of said threaded holes having a fluid passage connection with said tapered connection between said members, fluid in said one threaded hole and said fluid passage connection, threaded members extending through said holes in said keeper portion and threadably engaged in said threaded holes, said threaded members each having an outer and enlarged wrench receiving end, Teflon tape around a threaded portion of one of said threaded members for engagement in said one threaded hole whereby threaded engagement of said threaded member into said threaded hole permits fluid pressure build-up in said threaded hole and in between said tapered connection, whereby when said other threaded members are backed off partially in their corresponding threaded holes, said members are forcibly separated in an axial direction to an extent permitted by said keeper portion abutting against the enlarged wrench receiving ends of said other threaded members.

6. The assembly set forth in claim 5 further characterized in that said fluid passage connection includes an annular groove in the periphery of said axially tapered portion of said inner member, and a fluid passage connects said one threaded hole with said groove.

* * * * *